Patented Apr. 30, 1929.

1,711,032

UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

METHOD OF MAKING CHEESE.

No Drawing.   Application filed July 26, 1927. Serial No. 208,655.

This invention relates to improvements in the manufacture of cheese, and includes a new cheese product and an improved method for its manufacture.

The new cheese product of the present invention contains substantially all of the valuable food solids contained in cows' milk, and in approximately the same proportions in which these valuable solids are contained in the milk, making allowance for the usual cheese fermentations. The new cheese product is manufactured from milk without the waste which usually accompanies cheese manufacture.

From an economic standpoint, the most enlightened use of the milk supply of the country is for human food, first, in the form of whole milk, and second, in the form of evaporated milk or milk powder in districts where the whole milk cannot readily be transported to centers of consumption. In these forms, practically all of the valuable food ingredients of the milk is utilized as human food.

A large amount of milk is, however, employed in the manufacture of butter and cheese, but it is notorious that these dairy products involve an immense waste in their production. A typical cow's milk has the following composition:

|  | Per cent. |
|---|---|
| Water | 87.47 |
| Fat | 3.80 |
| Casein | 2.50 |
| Sugar | 4.80 |
| Albumin | 0.71 |
| Ash | 0.72 |

In the manufacture of butter, by far the greater portion of the non-fatty milk solids, including the protein, the milk sugar, the salt, vitamine B and some vitamine A are lost in the form of buttermilk, of which only a very small amount is used for human food and the larger and increasing proportion of which is used, either in its original form or after concentration or drying, for the feeding of fowls and pigs. In the manufacture of cheese by the methods heretofore employed, the butter fat and proteins are, for the most part, retaind in the product, but, nevertheless, the milk sugar, the salt, vitamine B and vitamine A are to a considerable extent wasted, and some protein is also lost in the whey. The whey solids from cheese are also used to a limited extent for stock feeding. The fact remains, however, that these by-products of the butter and cheese industry are at the present time for the most part degraded below human food standards of use and value, or are wasted altogether.

The new cheese product of the present invention is produced without the wastage of by-products, and eliminates the economic waste of valuable food ingredients of milk above mentioned. The valuable food solids which are lost in the whey at the present time are retained in the cheese product of the present invention which contains practically all of the milk solids. The milk sugar ordinarily lost in the whey, and which forms a larger part of the total milk solids than either the butter fat or the proteins, is retained in the new cheese product. Similarly, the valuable salts and the valuable vitamines which are commonly lost in whey are retained in the new cheese product. The new cheese therefore differs radically in its composition from ordinary cheese.

The composition of some of the common forms of cheese is indicated by the following figures taken from Elsdon's "Edible Oils and Fats" (Van Nostrand, 1926, page 426):

| Kind of cheese | Water | Fat | Protein | Lactic acid lactose | Ash |
|---|---|---|---|---|---|
| Cream | 20-58 | 37-90 | 2-16 | 0.2-1.2 | 0.3-3.4 |
| Camembert | 45-52 | 21-30 | 19-23 | 0.4 | 3.0-5.0 |
| Neufchâtel (Bondon) | 34-55 | 21-42 | 9-16 | 1.5-7.0 | 0.7-7.0 |
| Stilton | 20-35 | 30-44 | 24-36 | 1.0-3.3 | 2.7-4.0 |
| Cheddar | 27-34 | 26-33 | 27-46 | 0.9-1.9 | 3.6-4.7 |
| Cheshire | 30-40 | 25-34 | 23-36 | 2.4 | 3.6-4.8 |
| Gruyère | 31-37 | 27-30 | 28-35 | 0.7-3.3 | 3.1-5.3 |
| Roquefort | 21-37 | 30-36 | 24-33 | 0.7-1.9 | 4.4-7.0 |
| Skimmed milk | 28-42 | 10-26 | 30-44 | 0.8-4.2 | 4.2-6.4 |

The new cheese product of the present invention may have a moisture content comparable with the moisture content of the cheeses mentioned in the above list, but in its proportion of its milk solid constituents, and in its amounts of such constituents other than fat and protein, it will differ considerably from the compositions of the cheeses of the above table.

In making the new cheese product, I make use of milk so concentrated that the water in the concentrate approximates that of the cheese to be produced therefrom, and I subject this concentrated milk product to the cheese making operation, by treatment with a starter or culture, in cases where such starters are commonly used, and by coagulation with rennet. Since evaporated and dried milk do not coagulate readily with rennet, I add to the concentrated milk product, containing the evaporated milk or dried milk or both, an agent promoting such coagulation, and particularly a calcium salt, such as calcium chloride in minute quantities.

The concentrated milk product which is employed in making the new cheese product may be produced from milk in various ways. For example, milk may be directly concentrated to the desired moisture content by means of a well-known evaporating machinery such as is employed for making evaporated milk. Instead of concentrating the whole of the milk, milk powder separately prepared may be added to whole milk in such proportion that the final moisture content is that desired in the cheese product. Similarly, concentrated milk may be admixed with whole milk to give a concentrated product of the desired moisture content; or dried milk, concentrated or evaporated milk, and whole milk, may be admixed in proportions to give the desired moisture content. Dried milk may also be admixed with water in the required proportions to give the desired moisture content in the product. Dried milk can thus be employed, by admixing it with whole milk, with water, or with evaporated milk, before coagulation, and bringing the entire mix to the desired moisture content which is approximately that of the finished cheese, and then subjecting the resulting product to the cheese making operation to produce a cheese of similar moisture content and containing practically all of the milk solids of the milk from which the cheese is produced.

In the preferred practice of the invention, I make use of a moisture content in the milk concentrate of around 40 to 75%. Also, I have found it advantageous to have a certain percentage of whole milk present in the concentrated milk product, since cheese formation proceeds to better advantage under this condition. Dried milk can, however, be used alone with sufficient water to bring it to the desired moisture content.

The present invention is of more or less general application, so far as the character of cheese to be produced is concerned. That is, I may utilize the concentrated milk product, containing practically all the milk solids, in the production of a wide variety of cheeses, by subjecting the concentrated product to the action of appropriate bacteria or yeasts or molds and to coagulation with rennet, particularly when a minute amount of an agent, such as calcium salt, promoting coagulation is employed. In lieu of the direct introduction of bacteria or molds to promote the characteristic flavor of a particular kind of cheese, I sometimes introduce a small amount of completely cured cheese containing the culture and flavor desired.

In making different kinds of cheese by my process, I take cognizance of the different water contents of the different types of cheese. These variations are illustrated by the following table in which typical moisture limits are given for various kinds of cheese, the figures being taken from "The Book of Cheese" by Thom and Fisk (MacMillan, 1921, page 86):

| Variety of cheese | Per cent water | Per cent fat | Period required | Ripening agent |
|---|---|---|---|---|
| Hard: | | | | |
| Parmesan | 30-33 | | 2-3 years | Bacteria. |
| Swiss | 31-34 | 28-31 | 9-18 months | Bacteria and yeasts. |
| Cheddar | 30-39 | 32-36 | 6-12 months | Bacteria. |
| Semi-Hard: | | | | |
| Brick | 37-42 | 31-35 | 3-6 months | Bacteria. |
| Roquefort | 38-40 | 31-34 | 3-6 months | Mold. |
| Limburger | 40-45 | 24-30 | 3-6 months | Bacteria. |
| Soft: | | | | |
| Cream cheese | 40-50 | 35-45 | A few days | Primarily bacteria. |
| Camembert | 50 | 22-30 | 3-5 weeks | Molds. |
| Neufchâtel | 50-60 | 12-28 | A few days | Bacteria. |
| Skim Neufchâtel | 70 | Trace. | A few days | Bacteria. |
| Cottage | 70 | Trace. | A few days | Bacteria. |

From this tabulation, as well as from the figures previously given in the table from Elsdon's book, it will be seen that the moisture content of the same variety of cheese, and also of different types of cheese, varies within rather wide limits.

In the practice of the invention, the preliminary milk concentration is so adjusted as to be equal to the ordinary moisture content of the cheese desired. For example, in the manufacture of the cheese of Cheddar type, a moisture content between 35% and 45% will be ordinarily maintained, although a reasonable extension of these moisture limits may be possible. For other types of cheese, the moisture content of the concentrated milk mixture is similarly adjusted so that there will be no material change in moisture content between the initial mix and the cheese product, except, of course, the change due to the drying out of the cheese during the finishing and curing processes.

The treatment of the concentrated milk mixture for the manufacture of the new cheese product will vary with the particular type of cheese to be produced. In general, the process includes coagulation with rennet, but this coagulating treatment varies materially from the ordinary coagulation of milk with rennet in that there is no separation of whey and no loss of valuable milk solids in the whey such as accompanies ordinary cheese manufacture. The coagulation of the concentrated milk product, according to the present process, is carried out without material change in moisture content so that the coagulated product still retains practically all of the milk solids in practically the same proportions as in the concentrated milk product employed, although some change in composition may take place due to the action of the ripening agent upon the milk constituents.

The ripening agents employed will, as above pointed out, vary with the type of cheese to be produced, and these ripening agents may be such as are now employed in the manufacture of the various kinds of cheese. They will act, however, upon a concentrated milk product of different composition and will produce a cheese product likewise differing in composition from ordinary cheese products of the same type.

In addition to the use of rennet for coagulation and of the ripening agent, there is advantageously employed a minute quantity of a suitable salt to overcome the difficulty of coagulating evaporated milk and dried milk powder with rennet. A minute quantity of a suitable calcium salt, such as calcium chloride, overcomes this difficulty when added to the mix before the rennet is introduced.

The invention will be further illustrated by the following typical example, but it will be understood that the invention is not limited thereto.

A milk concentrate is made by mixing together sixty-five pounds of whole dried milk powder and thirty-five pounds of water, or larger or smaller amounts of materials in these proportions. The water is warmed to a temperature of 105 to 130° F. and mixed with the whole milk powder. The mixture is then placed in a mechanical mixer or beating machine and thoroughly mixed until a mix of uniform consistency is obtained. In order to overcome the resistance of heated milk products, such as whole dried milk powder, to coagulate, an addition is made of a small amount of calcium chloride or other calcium salts to the mix, preferably in the water which is added. Calcium chloride may thus be employed to the extent of 0.005% to 0.05% in the above mix. If starter is to be added, it is next introduced and the product is held at the desired culturing temperature for the desired length of time. Rennet is then introduced in order to induce coagulation. After the product has coagulated, it may be broken up and repressed into molds or forms or it may be molded into forms directly before complete coagulation has set in.

In place of the simple mixture of milk powder and water of the preceding example, I may make use of a whole milk powder and whole milk, as, for example, in the following proportions; whole milk powder sixty pounds, whole milk forty pounds. These are mixed together with or without the addition of a small quantity of a suitable calcium salt at a temperature of 105 to 130° F., recourse being had finally to a mechanical mixer in order to produce a smooth product. Culture, if any, is then added and finally the rennet, the resulting cheese being formed in the molds, preferably by the application of some pressure.

The cheese of the present invention and made, for example, as above described, is stored and cured in the usual way.

It will thus be seen that the present invention provides a new cheese product and process in which all of the milk solids are used, thus avoiding the losses characteristic of the cheese industry as practiced at present. Cheese made according to the present invention will rank with whole milk and concentrated milk from an economic standpoint, since practically all of the solids of the original milk are conserved. The new cheese process is likewise differentiated from ordinary cheese processes in that it eliminates the separation and loss of whey and of the valuable milk solids contained therein. The improved composition of the new cheese product makes it valuable from a dietary standpoint, as well as from an economic standpoint.

I claim:

1. A process of making cheese which comprises mixing dried milk powder with whole milk to form a mixture having approximately the moisture content desired for the finished cheese, and coagulating the concentrated product.

2. A process of making cheese which comprises mixing dried milk powder with whole milk to form a mixture having approximately the moisture content desired for the finished cheese, and culturing, coagulating and curing.

3. A process of making cheese which comprises admixing milk powder with water to give a concentrated milk product of approximately the moisture content of the finished cheese, and coagulating the same.

4. A method of making cheese which comprises forming a concentrated milk product containing dried or concentrated milk, adding a small amount of an agent promoting the coagulation by rennet, and subjecting the resulting mixture to coagulation by rennet.

5. A method of making cheese which comprises forming a concentrated milk product containing milk powder or concentrated milk, adding a minute amount of a suitable calcium salt promoting coagulation of the concentrated product by rennet, and subjecting the concentrated milk product containing approximately the moisture content of the finished cheese to coagulation with rennet.

6. A method of making cheese which comprises forming a concentrated milk product containing milk powder or concentrated milk and having approximately the moisture content of the finished cheese, adding to the concentrated product a minute amount of calcium chloride, and coagulating the concentrated product with rennet.

In testimony whereof I affix my signature.

WILLIAM D. RICHARDSON.